United States Patent [19]

Yoshitake et al.

[11] Patent Number: 5,164,789
[45] Date of Patent: Nov. 17, 1992

[54] METHOD AND APPARATUS FOR MEASURING MINUTE DISPLACEMENT BY SUBJECT LIGHT DIFFRACTED AND REFLECTED FROM A GRATING TO HETERODYNE INTERFERENCE

[75] Inventors: Yasuhiro Yoshitake, Yokohama; Yoshitada Oshida, Fujisawa; Soichi Katagiri, Hachioji; Shuji Sugiyama, Mito; Yoshimitsu Saze, Katsuta, all of Japan

[73] Assignee: Hitachi, Ltd., Tokyo, Japan

[21] Appl. No.: 789,006

[22] Filed: Nov. 7, 1991

[30] Foreign Application Priority Data

Nov. 9, 1990 [JP] Japan ................................. 2-302546
Nov. 21, 1990 [JP] Japan ................................. 2-314277

[51] Int. Cl.$^5$ ............................................. G01B 9/02
[52] U.S. Cl. ................................... 356/349; 356/356
[58] Field of Search ............... 356/356, 349, 400, 401, 356/363; 250/237 G

[56] References Cited

U.S. PATENT DOCUMENTS 4,710,026 12/1987 Magome et al. .................. 356/356

FOREIGN PATENT DOCUMENTS

| 61-215905 | 9/1986 | Japan . |
| 62-274216 | 11/1987 | Japan . |
| 63-135912 | 6/1988 | Japan . |
| 63-155014 | 6/1988 | Japan . |
| 64-32624 | 2/1989 | Japan . |
| 1-198019 | 8/1989 | Japan . |
| 1-243445 | 9/1989 | Japan . |

Primary Examiner—Samuel A. Turner
Assistant Examiner—Richard E. Kurtz, II
Attorney, Agent, or Firm—Antonelli, Terry, Stout & Kraus

[57] ABSTRACT

The present invention resides in method and apparatus for measuring a minute displacement, comprising applying a light of a first wavelength at a predetermined angle to a diffraction grating formed on an object whose position is to be detected, subjecting each of the resulting diffracted light and regular reflected light and a light of a second wavelength different from the first wavelength to heterodyne interference with each other to generate a measurement signal and a reference signal, and measuring a phase difference between the measurement signal and the reference signal to thereby determine a minute displacement of the object.

17 Claims, 6 Drawing Sheets

METHOD AND APPARATUS FOR MEASURING MINUTE DISPLACEMENT BY SUBJECT LIGHT DIFFRACTED AND REFLECTED FROM A GRATING TO HETERODYNE INTERFERENCE

BACKGROUND OF THE INVENTION

The present invention relates to method and apparatus for measuring a minute displacement of an object, using a diffraction grating.

Heretofore, in the manufacture of a semiconductor device there has been used a stepper for performing a reduced projection exposure while moving wafers successively step by step. The semiconductor device is manufactured by putting circuit patterns formed on each wafer and mask one upon another followed by exposure. Recently, such circuit patterns have become finer and higher in density, so it is necessary that the wafer and the mask be aligned in higher accuracy. To this end it is first required to measure the position of the circuit pattern on the wafer more accurately. As one method for this measurement there is known, for example, such a method using heterodyne interference as is disclosed in Japanese Patent Laid-Open Nos. 215905/86 and 274216/87. Now, an example of a minute displacement measuring apparatus using such known method will be described below with reference to FIG. 1.

FIG. 1 is a schematic construction diagram showing an example of conventional method and apparatus for measuring a minute displacement. In FIG. 1, the reference numeral 1 denotes a two-wavelength orthogonal polarizing laser; the numeral 2 denotes a half mirror; numeral 3 denotes a polarized beam splitter; numerals 4a, 4b and 4c denote mirrors; numeral 5 denotes a substrate; numeral 6 denotes a diffraction grating; numerals 8a and 8b denote polarizing plates; numerals 9a and 9b denote photo detectors; numerals 9a' and 9b' denote amplifiers; and numeral 10 denotes a detected signal processing portion.

In the above construction, coherent light beams whose wavelengths are slightly different from each other and whose polarization directions are orthogonal to each other, are emitted from the two-wavelength orthogonal polarizing laser 1. These light beams pass through the half mirror 2 and are separated into light beams wavelengths $\lambda_1$ and $\lambda_2$, respectively, by the polarized beam splitter 3. The thus-split light beams are allowed to travel through optical paths 111 and 112 by the mirrors 4a, 4b and 4c and enter the diffraction grating 6 as parallel beams. Primary diffracted light beams of wavelengths $\lambda_1$ and $\lambda_2$, respectively, travel along optical paths 121 and 122 which are perpendicular to the surface of the diffraction grating 6. The optical paths 121 and 122 are substantially the same, and a heterodyne interference signal $I_m$ is detected by the photo detector 9a through the polarizing plate 8a. This heterodyne interference signal is represented by the following equation:

$$I_m = A_m \cos\{(\omega_1-\omega_2)t + 4\pi\epsilon/P\} \quad (1)$$

wherein $A_m$ represents the amplitude of the heterodyne interference signal $I_m$; $\omega_1$ and $\omega_2$ represent angular frequencies of the wavelengths $\lambda_1$ and $\lambda_2$, respectively; t is time; P represents the pitch of the diffraction grating 6; and $\epsilon$ represents the amount of movement of the diffraction grating 6. Since the heterodyne interference signal $I_m$ contains information on the amount of movement $\epsilon$ of the diffraction grating 6, it will hereinafter be referred to as the measurement signal. The amount of movement of the diffraction grating 6 ca be determined by subtracting the time term $(\omega_1-\omega_2)$ from the phase of the measurement signal $I_m$ in the equation (1).

The said time term is measured separately as a reference signal. More specifically, the light beam emitted from the two-wavelength orthogonal polarizing laser 1 and reflected by the half mirror 2 is detected as a heterodyne interference signal $I_s$ by the photo detector 9b through the polarizing plate 8b. This heterodyne interference signal $I_s$, which is represented by the following equation, serves as a reference signal $I_s$:

$$I_s = A_s \cos\{(\Omega_1-\omega_2)t\} \quad (2)$$

wherein $A_s$ represents the amplitude of the reference signal $I_s$. Therefore, once a phase difference between the heterodyne interference signals $I_m$ and $I_s$ in the equations (1) and (2) detected by the photo detectors 9a and 9b is determined by the detected signal processing portion 10, the amount of movement $\epsilon$ of the diffraction grating is obtained from the pitch P of the diffraction grating 6. According to this method, since the phase of light is detected, the detection of position can be done in high accuracy independently of the distribution of illumination light and the resolution of an optical system in comparison with a conventional method in which the light intensity distribution of an alignment mark image is detected.

In the above prior art, since the phase of light is detected according to heterodyne interference, the phase of a detected interference signal involves an error due to the difference in density of the air present in the optical paths. More specifically, in the optical system of FIG. 1, the light beams of wavelengths $\lambda_1$ and $\lambda_2$ are spaced farthest from each other when passing through the optical paths 111 and 112, respectively. In this case, if the density of air differs depending on places, the refractive index also differs, so a phase difference occurs between the light beams of wavelengths $\lambda_1$ and $\lambda_2$ which have passed through the optical paths 111 and 112, and the heterodyne interference signal or measurement signal $I_m$ detected by the photo detector 9a is as follows:

$$I_m = A_m \cos\{(\Omega_1-\omega_2)t + 4\pi\epsilon/P + \gamma\} \quad (3)$$

wherein $\gamma$ represents a phase difference based on the density distribution of air and it is an error in obtaining the amount of movement $\epsilon$ of the diffraction grating 6 on the basis of the phase difference from the reference signal $I_s$ in the equation (2). The stepper is disposed within a chamber where there is the flow of air for keeping the temperature constant. If the flow of air goes away from an object, a vortex of a different density will be formed, and if this vortex crosses the optical paths 111 and 112, there will occur a measurement error. This error has been a problem in measuring a circuit pattern position on each wafer always in good reproducibility.

SUMMARY OF THE INVENTION

It is the object of the present invention to solve the above-mentioned problem of the prior art and provide method and apparatus for measuring a minute displacement capable of reducing the influence of the density distribution of air.

To this end, according to the present invention there are provided a method for measuring a minute displacement of an object whose position is to be detected, comprising applying a light beam of a first wavelength at a predetermined angle to a diffraction grating formed on the object, subjecting each of the resulting diffracted light beam and regular reflected light beam to heterodyne interference with a light beam of a second wavelength different from the first wavelength to generate a measurement signal and a reference signal, and then measuring a phase difference between the measurement signal and the reference signal to thereby measure a minute displacement of the object; as well as an apparatus for measuring a minute displacement of an object, including a diffraction grating fixed onto the object, a light source for generating a light beam of a first wavelength and a light beam of a second wavelength which are slightly different in frequency from each other, means for applying the light beam of the first wavelength to the diffraction grating, means for subjecting a diffracted light beam generated from the diffraction grating to heterodyne interference with the light beam of the second wavelength and producing a measurement signal, means for subjecting a regular reflected light beam generated from the diffraction grating to heterodyne interference with the light beam of the second wavelength and producing a reference signal, a photo detector means for detecting time variations of the measurement signal and the reference signal, and a signal processing circuit for calculating a phase difference between the measurement signal detected by the photo detector means and the reference signal and converting it into a displacement of the object.

According to the minute displacement measuring method and apparatus of the present invention, a coherent light beam of wavelength $\lambda_1$ is directed to a diffraction grating at an angle of about a half of a first order diffraction angle, then a first order diffracted light beam travelling back along the incident side optical path in the reverse direction and a coherent light beam of wavelength $\lambda_2$ are combined to produce a measurement signal, while a regular reflected light beam generated at the time of the light incidence and the coherent light beam of wavelength $\lambda_2$ are combined to produce a reference signal, and a displacement of the diffraction grating is determined from a phase difference between the measurement signal and the reference signal.

The measurement signal, $I_1$, and the reference signal, $I_0$, both generated in the above minute displacement measuring method and apparatus are as follows:

$$I_1 = A_1 \cos\{(\omega_1 - \omega_2)t + 2\pi\epsilon/P + \gamma_1\} \quad (4)$$

$$I_0 = A_0 \cos\{(\omega_1 - \omega_2)t + \gamma_0\} \quad (5)$$

where $\gamma_1$ and $\gamma_0$ represent phase terms based on refractive indices of the air present in the optical paths which generate the measurement signal and the reference signal, respectively. In this method, since the angle between the optical path of the measurement signal and that of the reference signal is about a half of the angle between two first order diffracted light beams in the conventional method, the optical path of wavelength $\lambda_1$ for generating the measurement signal is in proximity to the optical path of wavelength $\lambda_1$ for generating the reference signal. The optical path of wavelength $\lambda_2$ for generating the measurement signal and the optical path of wavelength $\lambda_2$ for generating the reference signal are also close to each other. Therefore, it is considered that the refractive indices of air in both optical paths for the measurement signal and the reference signal are almost the same, and hence $\gamma_1$ can be considered almost equal to $\gamma_0$. Accordingly, $\gamma_1$ and $\gamma_0$ can be cancelled by taking the difference between the phase terms in the equations (4) and (5), and it becomes possible to make a minute displacement measurement which is difficult to be influenced by the density distribution of air.

According to the present invention, the optical paths of wavelengths $\lambda_1$ and $\lambda_2$ for producing a heterodyne interference signal, or the measurement signal, and the optical paths of wavelengths $\lambda_1$ and $\lambda_2$ for producing the reference signal, using a diffraction grating, are close to each other, and this is effective in reducing the influence of the density distribution of air in the measurement of a minute displacement.

Moreover, the intensity of a first order diffracted light in a first state and that in a second state can be measured separately by making change-over of an AO modulator, and on the basis of the resulting measured values it is possible to correct a measured displacement in the case of an asymmetric resist distribution. Thus, a correct displacement can always be measured.

According to the present invention there are further provided a method for measuring a minute displacement of an object whose position is to be detected, comprising subjecting a light beam of a first wavelength and a light beam of a second wavelength which are slightly different in wavelength from each other, to heterodyne interference to generate a reference signal, further subjecting a diffracted light beam created when the light beam of the first wavelength is directed at a predetermined angle to a diffraction grating formed on the object, and a second regular reflected light beam created when the light beam of the second wavelength is made incident in a direction opposite to a reflective direction of a first regular reflected light beam created upon the incidence of the light beam of the first wavelength, to heterodyne interference to generate a measurement signal, and measuring a minute displacement of the object from a phase difference between the reference signal and the measurement signal; as well as an apparatus for measuring a minute displacement of an object, including a diffraction grating fixed onto the object, a light source for generating a light beam of a first wavelength and a light beam of a second wavelengths which are slightly different in wavelength from each other, means for subjecting the light beams of the first and second wavelengths to heterodyne interference and producing a reference signal, means for applying the light beams of the first and second wavelengths to the diffraction grating each at a predetermined angle, means for subjecting a diffracted light beam of the first wavelength generated from the diffraction grating and a regular reflected light beam of the second wavelength obtained at the same time, to heterodyne interference and producing a measurement signal, a first photo detector means for measuring a time variation of the reference signal, a second photo detector means for measuring a time variation of the measurement signal, and a signal processing circuit for calculating a phase difference between the reference signal and the measurement signal detected by the first and second photo detector means and then converting it into a displacement of the object.

Thus, coherent light beams of wavelengths $\lambda_1$ and $\lambda_2$ which are not made incident on the diffraction grating are combined to generate a reference signal, further a first order diffracted light beam created when the coherent light beam of wavelength $\lambda_1$ is made incident at an angle of about a half of the first order diffraction angle of the diffraction grating, and a regular reflected light beam created when the coherent light beam of wavelength $\lambda_2$ is made incident in a direction opposite to a reflective direction of a regular reflected light beam generated at the same time, are combined together to produce a measurement signal, and an amount of movement of the diffraction grating is determined from a phase difference between those signals In the above construction, the reference signal, $I'_0$, and the measurement signal, $I'_1$ are as follows:

$$I'_0 = A_0 \cos\{(\omega_1 - \omega_2)t + \gamma_{01} - \gamma_{02}\} \quad (6)$$

$$I'_1 = A_1 \cos\{(\omega_1 - \omega_2)t + 2\pi\gamma/P + \gamma_{11} - \gamma_{12}\} \quad (7)$$

wherein $\gamma_{01}$ and $\gamma_{02}$ represent phase terms based on refractive indices of air present in the optical paths along which there travel light beams of wavelengths $\lambda_1$ and $\lambda_2$ for generating the reference signal, while $\gamma_{11}$ and $\gamma_{12}$ represent phase terms based on refractive indices of air present in the optical paths along which there travel light beams of wavelengths $\lambda_1$ and $\lambda_2$ for generating the measurement signal. In the present invention, since the angle between the optical paths of wavelengths $\lambda_1$ and $\lambda_2$ for generating the measurement signal is about a half of the angle between two first order diffracted light beams in the conventional method, those optical paths are close to each other and it can be regarded that $\gamma_{11}$ is equal to $\gamma_{12}$. Since the optical paths of wavelengths $\lambda_1$ and $\lambda_2$ for generating the reference signal are also in close proximity to each other, $\gamma_{01}$ can be regarded as being equal to $\gamma_{02}$. In the equations (6) and (7), therefore, approximately $\gamma_{01} - \gamma_{02} = 0$ and $\gamma_{11} - \gamma_{12} = 0$, whereby there can be realized method and apparatus for measuring a minute displacement which are difficult to be influenced by the density distribution of air.

Thus, according to the present invention, in the measurement of a minute displacement using heterodyne interference, since the angle between the optical paths of wavelengths $\lambda_1$ and $\lambda_2$ for generating the measurement signal is about a half of the angle between two first order diffracted light beams in the conventional method, those optical paths are in proximity to each other, and the optical paths for generating the reference signal are also very close to each other, so it is possible to diminish the influence of the density distribution of air in the minute displacement measurement. It is also possible to detect first and second measurement signals simultaneously, and in this case the reference signal can be omitted. Further, since it is possible to measure the intensities of the first and second light beams of first order diffraction separately, a measured displacement in the case of an asymmetric resist distribution on the diffraction grating can be corrected on the basis of such measured values, thus permitting constant measurement of an exact displacement.

DETAILED DESCRIPTION OF PREFERRED EMBODIMENTS

A first embodiment of the present invention will be described below with reference to FIGS. 2 to 8.

Figure 2:
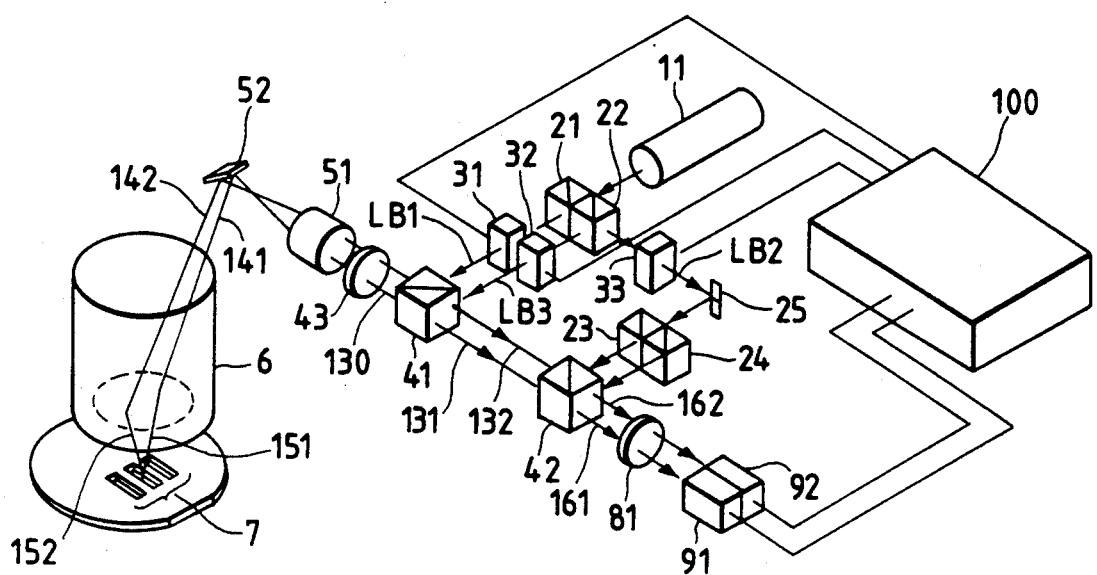
FIG. 2 is a schematic construction diagram showing method and apparatus for measuring a minute displacement according to a first embodiment of the present invention.

FIG. 2 is a schematic construction diagram showing method and apparatus for measuring a minute displacement according to a first embodiment of the present invention. In FIG. 2, the numeral 11 denotes a linear polarization laser having a vertical polarization; numerals 21, 22 and 23 denote half mirrors; numerals 24 and 25 denote mirrors; numerals 31, 32 and 33 denote AO (acousto-optical) modulators; numerals 41 and 42 denote polarized beam splitters; numeral 43 denotes a ¼ wavelength plate; numeral 51 denotes a collimator lens; numeral 52 denotes a mirror; numeral 6 denotes a reduction lens; numeral 7 denotes a diffraction grating; numeral 81 denotes a polarizing plate; numerals 91 and 92 denote photo detectors; and numeral 100 denotes processing/control circuit.

In the above construction, light emitted from the linear polarization laser 11 is divided into three light beams by the half mirrors 21 and 22, of which two light beams are incident on the AO modulators 31 and 32, which in turn shift the frequency of the incident light beams by a drive frequency $f_1$ which is fed from the processing/control circuit 100. When the AO modulator 31 is turned ON and the AO modulator 32 OFF, as the first state, a light beam LB1 of wavelength $\lambda_1$ is emitted from the AO modulator 31. The light beam LB1 is applied as S polarized light to the polarized beam splitter 41, so is mostly reflected, travels along an optical path 130 and is incident on the ¼ wavelength plate 43, whereby the light beam LB1 is made into a circularly polarized light. The circularly polarized light travels along an optical path 141 through the collimator lens 52 and the mirror 52, then travels along an optical path 151 through the reduction lens 6 and is incident on the diffraction grating 7 on the wafer at a predetermined angle which is about a half of the first order diffraction angle. A first order diffracted light from the diffraction grating 7 travels back through the optical path 151, while a regular reflected light travels along an optical path 152. Then, both travels back along optical paths 141 and 142, respectively, through the reduction lens 6, then further through the mirror 52 and the collimator lens 51 back to the ¼ wavelength plate 43. By the ¼ wavelength plate 43 these light beams are converted into linearly polarized light beams orthogonal to their incident direction, which beams are then incident on the polarized beam splitter 41 as P polarized beams. After passing through the splitter 41, the first order diffracted light beam and the regular reflected light beam travel along the optical paths 131 and 132, respectively, then are incident on the polarized beam splitter 42 and pass through it.

On the other hand, out of the light beams emitted from the linear polarization laser 11, one light beam which has been reflected by the half mirror 21 and passed through the half mirror 22 enters the AO modulator 33. Since the AO modulator 33 is driven at a frequency $f_2$, it emits a light beam LB2 of wavelength $\lambda_2$ which is slightly different from the wavelength $\lambda_1$. The light beam LB2 travels through the mirror 25 and is split into two light beams by the half mirrors 23 and 24. The two light beams are incident on the polarized beam splitter 42 as S polarized light beams, reflected thereby, then travel along optical paths 161 and 162. The optical paths along which the light beams after the bisplitting of the light beam LB2 of wavelength $\lambda_2$ travels are close to each other. If the polarizing plate 81 positioned ahead of the optical paths 161 and 162 is inclined at 45° with respect to the horizontal direction, then in the photo detector 91 positioned ahead of the polarizing direction, then in the photo detector 91 positioned ahead of the polarizing plate 81, a heterodyne interference signal produced through the polarized beam splitter 42 from both the first order diffracted light of wavelength $\lambda_1$ travelling along the optical path 131 and the light of wavelength $\lambda_2$ which has passed through the half mirror 23 is detected as a measurement signal, while in the photo detector 92, a heterodyne interference signal produced through the polarized beam splitter 42 through both the regular reflected light of wavelength $\lambda_1$ travelling along the optical path 132 and the light of wavelength $\lambda_2$ which has passed through the mirror 24 is detected as a reference signal. The heterodyne interference signals thus detected as a measurement signal and a reference signal, respectively, by the photo detectors 91 and 92 are fed to the processing/control circuit 100, which in turn calculates a phase difference between the measurement signal and the reference signal, then converts it into a displacement of the diffraction grating 7 and outputs a minute displacement of the same grating.

Figure 3A:
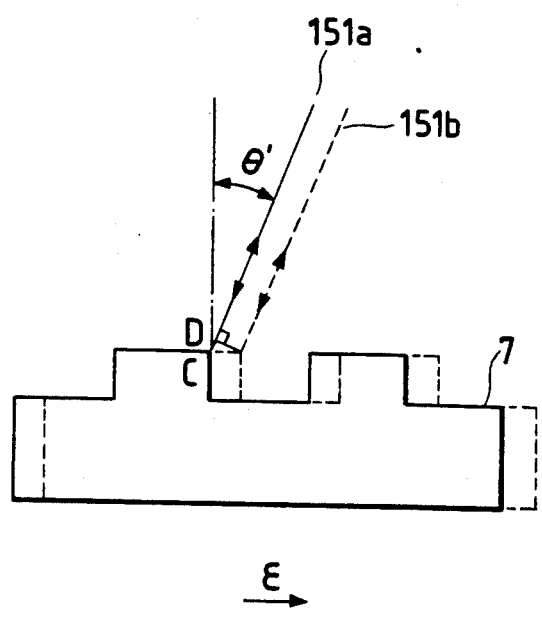
FIG. 3(a) is a detail view showing a displacement of a diffraction grating illustrated in FIG. 2 and also showing optical paths.
Figure 3B:
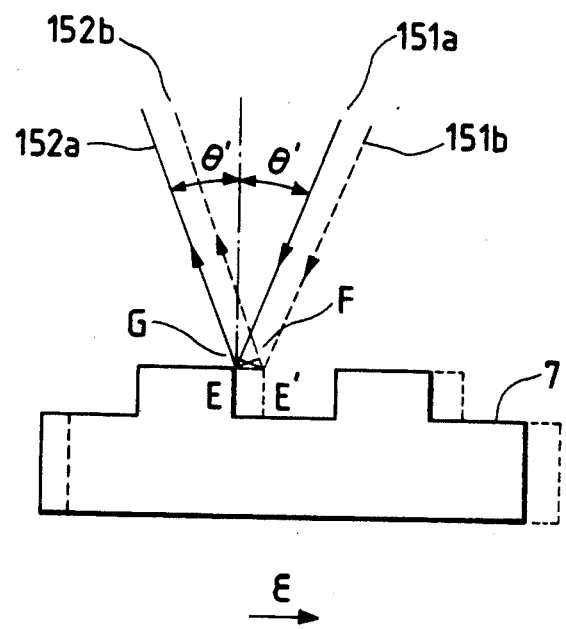
FIG. 3(b) shows a displacement of the diffraction grating illustrated in FIG. 2 and also shows optical paths.

FIGS. 3(a) and 3(b) are detail views each showing a displacement of the diffraction grating 7 used in the apparatus of FIG. 2 and the optical paths 151, 152. With reference to these figures, the relation between a displacement e of the diffraction grating 7 illustrated in FIG. 2 and a phase difference $\Delta\phi$ between the measurement signal and the reference signal detected by the photo detectors 91 and 92 will now be explained. First, a phase variation of the measurement signal detected by the photo detector 91 will be explained with reference to FIG. 3(a). When a coherent light of wavelength $\lambda_1$ travels along an optical path 151a and is incident on the diffraction grating 7 at an angle of $\theta'$, a first order diffracted light travels back through the same optical path 151a, provided it is assumed that the angle $\theta'$ satisfies the following equations:

$$\sin\theta' = \lambda_1/2P = \tfrac{1}{2}\sin\theta \qquad (8)$$

$$\theta' \approx \tfrac{1}{2}\theta \qquad (8')$$

wherein P represents a pitch of the diffraction grating 7 and $\theta$ represents a first order diffraction angle. The position of the diffraction grating 7 after displacement $\epsilon$ is as indicated by a broken line. In this case, the difference in length between an optical path of the incident light and the primary diffracted light and the original optical path 151a is $2\overline{DC}$, which can be expressed as follows:

$$2\overline{DC} = 2\epsilon\sin\theta' = 2\epsilon\theta_1/2P = \epsilon\theta_1/P \qquad (9)$$

A phase variation $\phi_1$ of the measurement signal at the displacement $\epsilon$ of the diffraction grating 7 is:

$$\phi_1 = 2\pi\epsilon/P \qquad (10)$$

Next, a phase variation of the reference signal detected by the photo detector 92 will be explained with reference to FIG. 3(b). When a coherent light of wavelength $\lambda_1$ travels along the optical path 151a and is incident at an angle of $\theta'$ relative to the diffraction grating 7, a regular reflected light travels along an optical path 152a at a reflection angle $\theta'$. Like the foregoing, the position of the diffraction grating 7 after displacement e is as indicated by a broken line. In this case, the incident optical path and the reflective optical path are as indicated by the reference numerals 151b and 152b, respectively, and the difference between the optical path length before the displacement and that after the displacement is $\overline{GE} - \overline{FE'}$. Since the incidence angle $\theta'$ and the reflection angle $\theta'$ are equal to each other, $\overline{GE} - \overline{FE'} = 0$. Consequently, a phase variation $\phi_0$ of the reference signal at the displacement $\gamma$ of the diffraction grating 7 is also equal to 0. From this result, the phase difference $\Delta\phi$ between the measurement signal and the reference signal is as follows:

$$\Delta\phi = \phi_1 - \phi_0 = 2\pi\gamma/P \qquad (11)$$

Since the phase measuring range is $-\pi < \Delta\phi < \pi$, the displacement measuring range is $-P/2 < \gamma < P/2$. From the equation (1) the conventional measuring range is $-P/4 < \gamma < P/4$ and thus this embodiment of the present invention is advantageous in that the measuring range widens twice.

Figure 4:
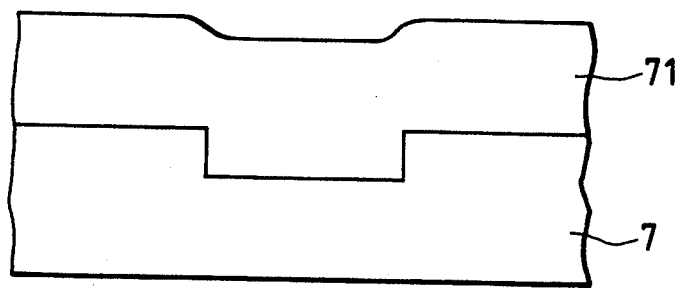
FIG. 4 is a section view showing a symmetric resist distribution on the diffraction grating illustrated in FIG. 2.

FIG. 4 is a detail view showing a symmetric resist distribution on the diffraction grating used in the apparatus of FIG. 2. The following description is now provided about the method of measuring the displacement $\gamma$ in the case where a resist is present on the diffraction grating as an alignment mark. In this case, a phase difference $\Delta\phi_a$ between the measurement signal and the reference signal detected by the photo detectors 91 and 92 is as follows:

$$\Delta\phi_a = 2\pi\gamma/P + a - c \quad (12)$$

wherein a and c represent phases of the measurement signal and the reference signal based on multiple reflection by the resist 71. More particularly, when the resist 71 is present on the diffraction grating 7, an offset of a-c is added to the phase difference. How to remove this offset will be described below.

In the foregoing description related to FIG. 2, the AO modulators 31 and 32 were turned ON and OFF, respectively, as the first state. This time, conversely, the AO modulators 31 and 32 are turned OFF and ON, respectively, as the second state. A light beam LB3 of wavelength $\lambda_1$ emitted from the AO modulator 32 travels along an optical path which is symmetric with respect to the light beam LB1 of wavelength $\lambda_1$ emitted from the AO modulator 31, relative to the optical axis of the optical system illustrated in FIG. 2. More specifically, the incident light is applied to the diffraction grating 7 through the optical path 152, while a first order diffracted light travels back through the optical path 152 and a regular reflected light travels along the optical path 151. Therefore, reversely to the foregoing case, the photo detector 91 detects a heterodyne interference signal from both the regular reflected light of wavelength $\lambda_1$ as a reference signal and the light of wavelength $\lambda_2$, while the photo detector 92 detects a heterodyne interference signal from both the first order diffracted light of wavelength $\lambda_1$ as a measurement signal and the light of wavelength $\lambda_1$. In this case, a phase difference $\Delta\phi_b$ between the measurement signal and the reference signal is:

$$\Delta\phi_b = -2\pi\gamma/P + a - c \quad (13)$$

Therefore, if the difference between the equations (12) and (13) is taken, the result is:

$$\Delta\phi_a - \Delta\phi_b = 4\pi\gamma/P \quad (14)$$

Thus, the offset a-c can be cancelled. In this way, by changing over the AO modulators 31 and 32 from the first to the second state with time, then determining measurement signal - reference signal phase differences in those states and taking the difference between those phase differences, there can be realized a measurement of displacement $\gamma$ free of offset error even in the presence of the symmetric resist 71.

Figure 5:
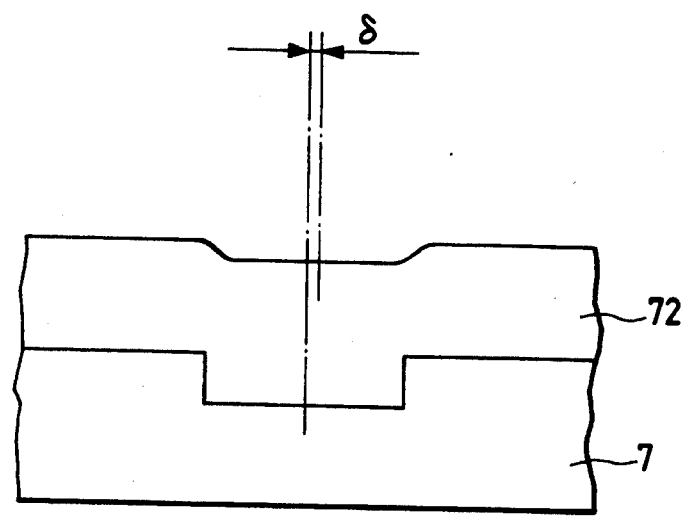
FIG. 5 is a sectional view showing an asymmetric resist distribution on the diffraction grating illustrated in FIG. 2.

FIG. 5 is a detail view showing an asymmetric resist distribution on the diffraction grating 7 used in the apparatus of FIG. 2. The following description is now provided about the case where the distribution of resist 72 on the diffraction grating 7 is asymmetric. Since the resist 72 is applied rotatively, the distribution thereof is in many cases asymmetric with respect to the diffraction grating 7. For example, a central line of a concave portion of the resist 72 shifts by an amount $\delta$ with respect to a central line of a concave portion of the diffraction grating y. In this case, a phase difference $\Delta\phi_e$ between the measurement signal and the reference signal detected by the photo detectors 91 and 92 in the first state of the AO modulators 31 and 32, and a phase difference $\Delta\phi_f$ between both signals in the second state of those AO modulators, are as follows:

$$\Delta\phi_e = 2\pi\gamma/P + e - g \quad (15)$$

$$\Delta\phi_f = -2\pi\gamma/P + f - g \quad (16)$$

wherein e, f and g represent the phase of the measurement signal in the first state, the phase of the measurement signal in the second state and that of the reference signal, respectively. Like the above, if the difference between the equations (15) and (16) is taken, the result is:

$$\Delta\phi_e - \Delta\phi_f = 4\pi\gamma/P + e - f \quad (17)$$

However, since $e \neq f$ in the case where the distribution of the resist 72 is asymmetric as in FIG. 5, there remains an offset error of e-f.

Figure 6:
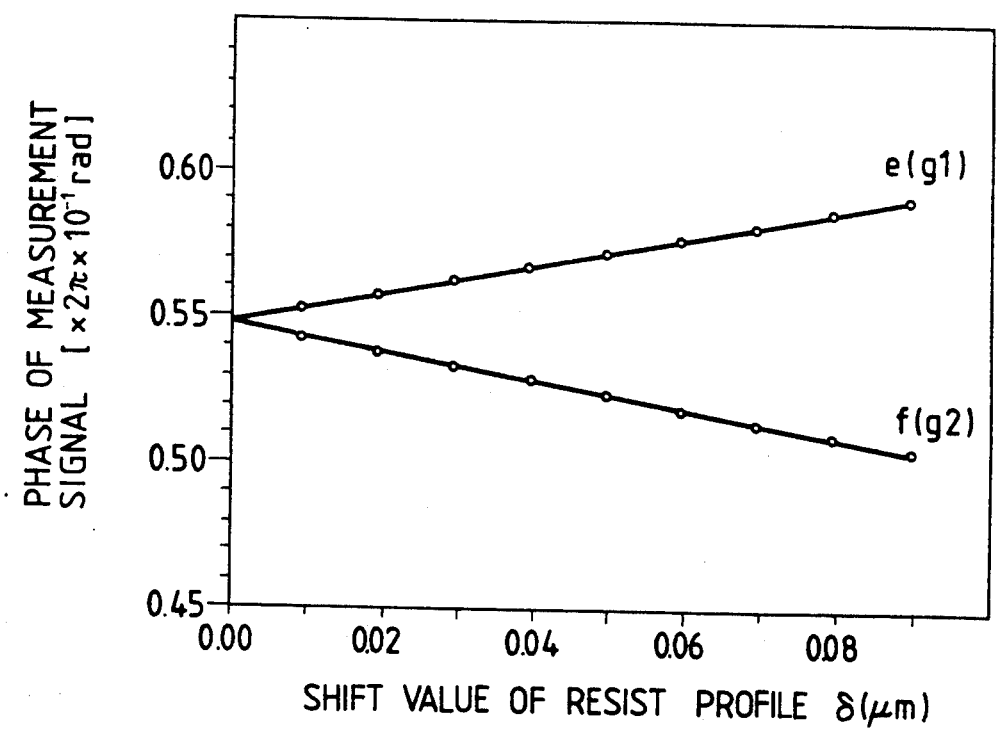
FIG. 6 is a calculation example diagram showing a relation between the amount of resist shift and phases of measurement signals in first and second states.
Figure 7:
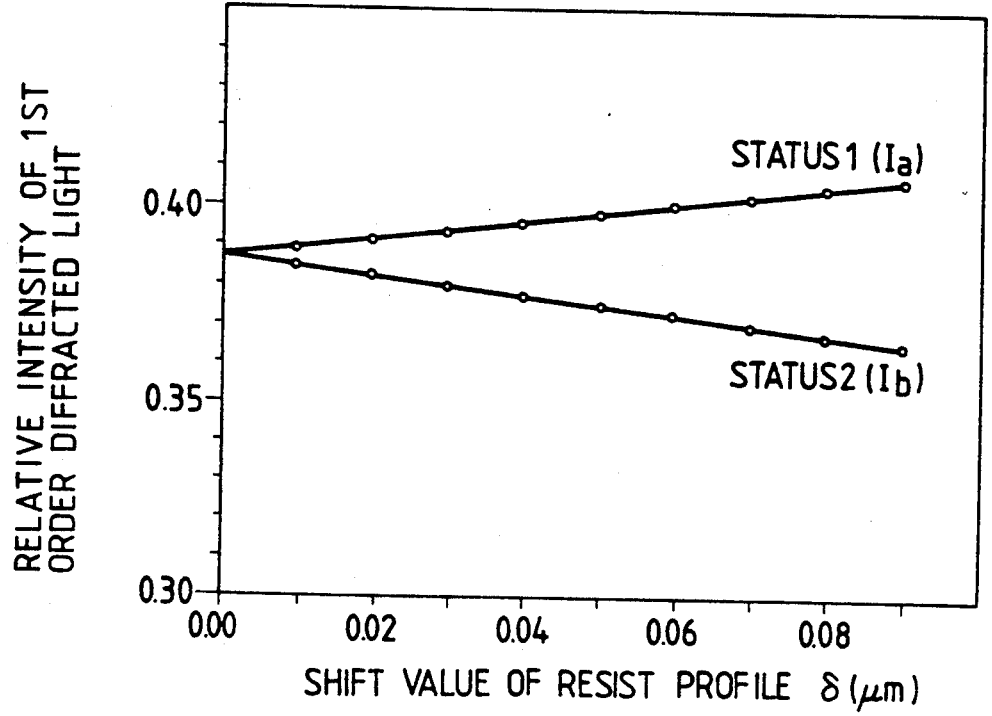
FIG. 7 is calculation example diagram showing a relation between the amount of resist shift and intensities of first order diffracted light beams in the first and second states.
Figure 8:
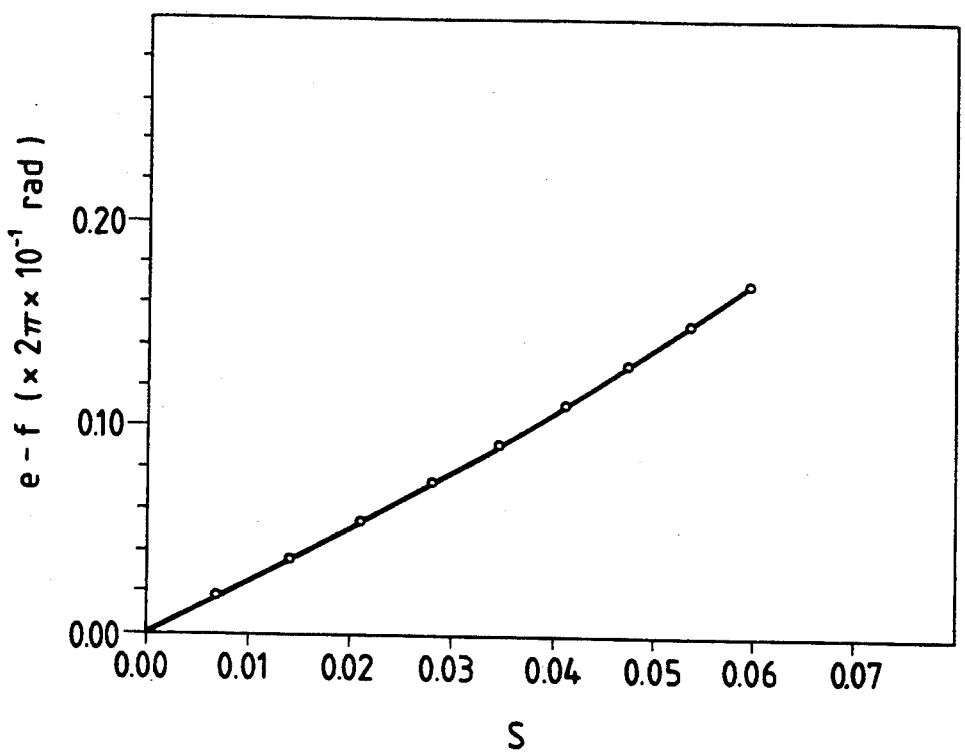
FIG. 8 is a calculation example diagram showing a relation between the difference in intensity of the first order diffracted light beams in the first and second states in FIGS. 6 and 7 and the difference in phase of the measurement signals in the two states, in the first embodiment of the present invention.

The following description is now provided about the method of obtaining a correct value of displacement $\gamma$ by measuring the offset error e-f indirectly and substituting it into the equation (17), with reference to FIGS. 6 to 8. It is here assumed that the asymmetry of the resist 72 can be expressed in terms of the amount of shift $\delta$ of the central line of the concave portion of the resist 72 with respect to the central line of the concave portion of the diffraction grating 7, as in FIG. 5. The values of the measurement signal phases e and f in the first and second states relative to the amount of shift $\delta$ can be calculated by the method described, for example, in J. Opt. Soc. Am. A, Vol. 5, No. 8 (1988), pp. 1270–1280.

FIG. 6 is a calculation example diagram showing a relation between the amount of shift $\delta$ of the resist 72 in FIG. 5 and the measurement signal phases e, f in the first and second states. An example of calculation results based on the method described in the above literature is shown therein, in which the amount of shift $\delta$ and the measurement signal phases e, f are plotted along the axis of abscissa and the axis of ordinate, respectively. The larger the amount of shift $\delta$ of the resist 72, the larger becomes the difference between the measurement signal phases e and f.

FIG. 7 is a calculation example diagram showing a relation between the amount of shift $\delta$ of the resist 72 and the first order diffracted light intensities in the first and second states. In the same figure there is shown an example of calculation results which calculation has been made about the said relation in the same manner as in FIG. 6. Also in this relation, the larger the amount of shift $\delta$, the larger the difference in intensity between the first order diffracted light in the first state and that in the second state. Thus, the measurement signal phase e-f difference and the first order diffracted light intensity difference in the two states are correlated with each other, so the offset e-f can be determined indirectly by measuring the first order diffracted light intensity difference in the two states.

FIG. 8 is a calculation example diagram showing a relation between the first order diffracted light intensity difference, S, in the first and second states in FIGS. 6 and 7 and the offset error e-f which is the measurement signal phase difference in the two states. In FIG. 8, the offset error e-f is plotted along the axis of ordinate, and the first order diffracted light intensity difference S in the two states, which is represented by the following equation, is plotted along the axis of abscissa:

$$S = (I_a - I_b) / (I_a + I_b) \quad (18)$$

wherein $I_a$ and $I_b$ represent first order diffracted light intensities in the first and second states, respectively. Into the first order diffracted light intensity $I_a$ there may be substituted the amplitude of the heterodyne interference signal detected by the photo detector 91 in the first state in FIG. 2, while into the first order diffracted light intensity $I_b$ there may be substituted the amplitude of the heterodyne interference signal detected by the photo detector 92 in the second state. The processing-/control circuit 100 calculates the first order diffracted light intensity difference S on the basis of the first order diffracted light intensities $I_a$, $I_b$ and in accordance with the equation (18), calculates the offset error e-f from the predetermined intensity difference S - offset error e-f relation, then substitutes the result into the equation (17), thereby obtaining a correct displacement $\epsilon$ value.

According to the above procedure, it is possible to obtain an accurate displacement $\epsilon$ value even in the case where the distribution of the resist 72 in FIG. 5 is asymmetric with respect to the diffraction grating 7 as an alignment mark. A method of correcting an error based on the asymmetry of resist, from the difference in intensity of two first order diffracted light beams, is disclosed also in Japanese Patent Laid-Open No. 242904/89. But according to the embodiment of the present invention, since the detection of a heterodyne interference signal and the detection of a first order diffracted light intensity can be done by a single photo detector, it is possible to simplify the signal processing system as compared with the conventional method disclosed in the above patent laid-open print.

By radiating the light of wavelength $\lambda_1$ to the diffraction grating 7 directly from the collimator lens 51 without passing through the reduction lens 6 in FIG. 2, the present invention can also be applied to minute displacement measuring method and apparatus in a proximity exposure system or a drawing system using electron beam.

Figure 9:
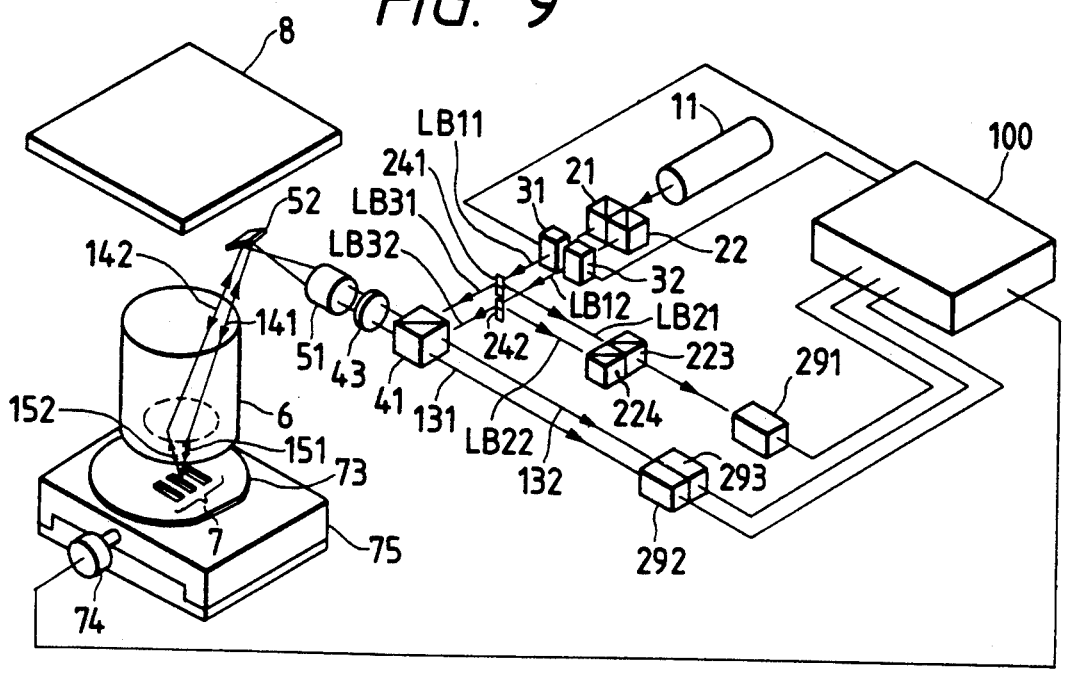
FIG. 9 is a schematic construction diagram showing method and apparatus for measuring a minute displacement according to a second embodiment of the present invention.

A second embodiment of the present invention will be described below with reference to related drawings. FIG. 9 is a perspective view schematically showing a construction of a minute displacement measuring apparatus according to the second embodiment, in which the parts common to those in FIG. 2 which illustrates the first embodiment of the present invention are indicated by the same reference numerals as in FIG. 2.

In FIG. 9, light emitted from a linear polarization laser light source 11 having a vertical polarization is divided into two light beams by half mirrors 21 and 22, which beams are then incident on AO modulators 31 and 32, respectively. The AO modulators 31 and 32, to which are inputted drive frequencies $f_1$ and $f_2$, shift the frequencies of the incident light beams by the inputted frequencies. More specifically, a light beam LB11 of wavelength $\lambda_1$ is emitted from the AO modulator 31, while a light beam LB12 of wavelength $\lambda_2$ is emitted from the AO modulator 32. The beams LB11 and LB12 are divided into beams LB21, LB31 and beams LB22, LB32, respectively, by half mirrors 241 and 242. The beam LB21 passes through a half mirror 223, while the beam LB22 is reflected by a half mirror 224 and the half mirror 223, then both travel along the same optical path. Thereafter, a heterodyne interference signal is detected by a photo detector 291 and it serves as a reference signal. On the other hand, the beam LB31 of wavelength $\lambda_1$ and the beam LB32 of wavelength $\lambda_2$ are incident on a polarized beam splitter 41 as S polarized light beams, so are mostly reflected and enter a ¼ wavelength plate 43, thereby are made into a circularly polarized light beams, which are then incident on a collimator lens 51. The beam LB31 of wavelength $\lambda_1$ travels along an optical path 141 through a mirror 52, then travels along an optical path 151 through a reduction lens 6 and is incident on a diffraction grating 7 on a wafer at a predetermined angle which will be described later. Then, a first order diffracted light beam of wavelength $\lambda_1$ generated in the diffraction grating 7 travels back through the optical path 151, while a regular reflected light beam advances through an optical path 152. Likewise, the beam LB32 of wavelength $\lambda_2$ travels along an optical path 142 through a mirror 52, further travels along the optical path 152 through the reduction lens 6 and is incident on the diffraction grating 7 on the wafer at a predetermined angle which will be described later. Then, a first order diffracted light beam of wavelength $\lambda_2$ generated in the diffraction grating 7 travels back through the optical path 152, while a regular reflected light beam advances through the optical path 151. The first order diffracted light beam of wavelength $\lambda_1$ and regular reflected light beam of wavelength $\lambda_2$ travel back along the optical path 141 through the reduction lens 6, while the first order diffracted light beam of wavelength $\lambda_2$ and regular reflected light beam of wavelength $\lambda_1$ travel back through the optical path 142. These light beams pass through the mirror 52 and the collimator lens 51 and are converted by the ¼ wavelength plate 43 into linearly polarized light beams in the direction orthogonal to the incident direction. The linearly polarized light beams are incident on the polarized beam splitter 41 as P polarized beams and mostly pass through the splitter. Thereafter, the first order diffracted light beam of wavelength $\lambda_1$ and regular reflected light beam of wavelength $\lambda_2$ travel along an optical path 131, then a heterodyne interference signal is detected by a photo detector 91 and it serves as a first measurement signal. On the other hand, the first order diffracted light beam of wavelength $\lambda_2$ and regular reflected light beam of wavelength $\lambda_1$ travel along an optical path 132, then a heterodyne interference signal is detected by a photo detector 92 and it serves as a second measurement signal. These first and second measurement signals and the foregoing reference signal are fed to the processing/control circuit 100, which in turn calculates a phase difference of these signals, converts it into a displacement and thereby outputs a minute displacement of the diffraction grating 7.

The following description is now provided about a relation between the displacement $\epsilon$ of the diffraction grating 7 and the reference signal—first measurement signal phase difference, with reference to the same FIG. 3 as that used in the first embodiment of the invention.

First, a study will be made about a phase variation of the first order diffracted light beam of wavelength $\lambda_1$ caused by the displacement of the diffraction grating 7. When a coherent light of wavelength $\lambda_1$ travels along the optical path 151a and is incident on the diffraction grating 7 at an angle of $\theta'$, a first order diffracted light travels back through the same optical path 151a, provided it is assumed that the angle $\theta'$ satisfies the following equation:

$$\sin \theta' = \lambda_1/2P \quad (19)$$

P : pitch of the diffraction grating 7 On the other hand, since the first order diffraction angle $\theta$ satisfied the following equation:

$$\sin\theta = \lambda_1/P \qquad (19')$$

the angle of incidence $\theta'$ is about a half of the first order diffraction angle as shown below:

$$\theta' \approx \lambda_1/2P \approx \theta/2 \qquad (19'')$$

The position of the diffraction grating 7 after displacement $\epsilon$ is as indicated by a broken line. In this case, the difference in length between an optical path 151b of the incident light and the first order diffracted light and the original optical path 151a is $2\overline{DC}$, which can be expressed as follows:

$$2\overline{DC} = 2\epsilon\lambda_1/2P = \epsilon\lambda_1/P \qquad (20)$$

And a phase variation $\phi_1$ of the primary diffracted light upon displacement $\epsilon$ of the diffraction grating 7 becomes as follows:

$$\phi_1 = 2\pi\epsilon/P \qquad (21)$$

Figure 10:
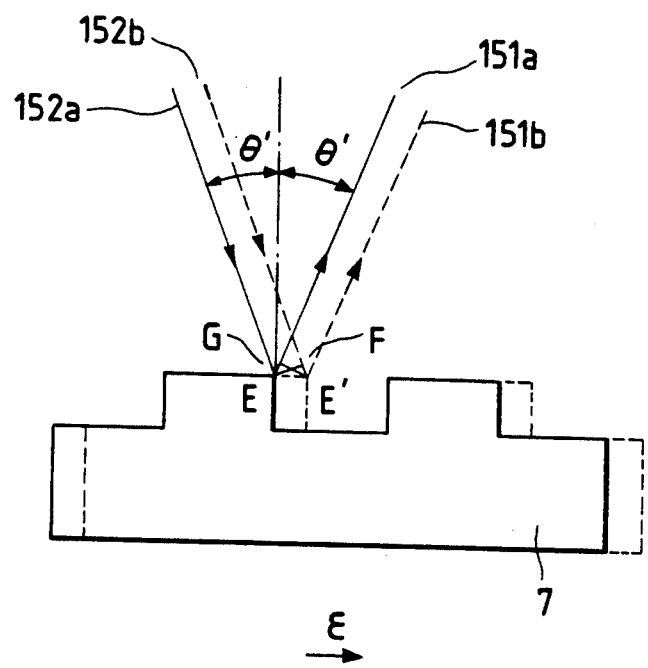
FIG. 10 is a detail view showing a diffraction grating optical paths illustrated in FIG. 9.

A study will now be made about a phase variation of the regular reflected light of wavelength $\lambda_2$ with reference to FIG. 10. When a coherent light of wavelength $\lambda_2$ travels along the optical path 152a and is incident on the diffraction grating 7 at an angle of $\theta'$ with respect to the diffraction grating 7, a regular reflected light advances to the optical path 151a at a reflection angle $\theta'$. In this case, the position of the diffraction grating 7 after displacement $\epsilon$ is as indicated by a broken line. The incident optical path and reflective optical path are 152b and 151b, respectively, and the difference in optical path length before and after the displacement is $\overline{GE} - \overline{FE'}$. Since the angle of incidence and the angle of reflection are equal to each other, $\overline{GE} - \overline{FE'} = 0$. Consequently, a phase variation $\phi_0$ of the regular reflected light upon displacement $\epsilon$ of the diffraction grating 7 is also 0.

Since the phase of the reference signal is constant independently of the displacement $\epsilon$ of the diffraction grating 7, the phase difference $\Delta\phi$ between the first measurement signal and the reference signal after displacement of the diffraction grating 7 is as follows:

$$\Delta\phi = \phi_1 - \phi_0 = 2\pi\epsilon/P \qquad (22)$$

Since the phase measuring range in this case is $-\pi < \Delta\phi < \pi$, the displacement measuring range is $-P/2 < \epsilon < P/2$. On the other hand, the measuring range in the prior art is $-P/4 < \epsilon < P/4$ from the equation (1). Thus, the method of the present invention is advantageous in that the measuring range widens twice.

Now, how to measure the displacement $\epsilon$ in the presence of a resist on the alignment mark will be explained. First, it is assumed that a resist 71 having a symmetric distribution is present on the diffraction grating 7 as the alignment mark, as shown in FIG. 3 which has already been explained in the first embodiment of the invention. In this case, consideration is needed about multiple reflection in the resist 71, and a phase difference $\Delta\phi_a$ between the first measurement signal and the reference signal is as follows:

$$\Delta\phi_a = 2\pi\epsilon/P + e \qquad (23)$$

wherein e represents a phase difference between a first order diffracted light and a regular reflected light which are created by multiple reflection in the resist 71. In the case where the resist 71 is present on the diffraction grating 7, an offset e is added to the phase difference between the first measurement signal and the reference signal. How to remove this offset will be described below.

In the present invention, the second measurement signal can also be measured at the same time and it is possible to utilize the information contained therein. A phase difference $\Delta\phi_b$ between the second measurement signal and the reference signal is as follows:

$$\Delta\phi_b = -2\pi\epsilon/P + e \qquad (24)$$

From the equations (23) and (24), by taking the difference between $\Delta\phi_a$ and $\Delta\phi_b$, there is obtained: Thus the offset e be removed If the phases of the first and second measurement signals are $\phi_a$ and $\phi_b$, respectively, and that of the reference signal is $\phi_c$, then:

$$\Delta\phi_a - \Delta\phi_b = \phi_a - \phi_c - (\phi_b - \phi_c) = \phi_a - \phi_b \qquad (26)$$

Therefore, from only the phases of the first and second measurement signals there can be determined the displacement $\epsilon$ of the diffraction grating 7. Thus, once the second measurement signal is obtained, the reference signal is no longer needed and hence it is possible to omit the half mirrors 241, 242, 223, the mirror 224 and the photo detector 291 which are shown in FIG. 9.

A study will now be made about the case where the distribution of the resist on the diffraction grating 7 is asymmetric as in FIG. 4 which has already been referred to in the first embodiment of the invention. Since the resist is applied rotatively, the resist distribution is in many cases asymmetric with respect to the diffraction grating 7. In this case, $\phi_a - \phi_b$ in the equation (26) is as follows:

$$\phi_a - \phi_b = 4\pi\epsilon/P + g \qquad (27)$$

wherein g represents a phase difference of first order diffracted light beams generating the first and second measurement signals, caused by the asymmetric distribution of the resist 72. This g corresponds to an offset error in determining the displacement e of the diffraction grating 7. So the following description is now provided about the method of obtaining a correct displacement $\epsilon$ value by measuring the g indirectly and substituting it into the equation (27).

It is here assumed that the asymmetry of the resist can be expressed in terms of the amount of shift $\delta$ of the central line of the concave portion of the resist with respect to the central line of the concave portion of the diffraction grating 7, as shown in FIG. 4. In the case where there is the amount of shift $\delta$, the value of phase g1 of a first order diffracted light (hereinafter referred to as "the first light beam of first order diffraction") which generates the first measurement signal, and the value of phase g2 of a first order diffracted light (hereinafter referred to as "the second light beam of first order diffraction") which generates the second measurement signal, can be calculated, for example, by the method described in J. Opt. Soc. Am. A, Vol. 5, No. 8 (1988), pp. 1270-1280. An example of results of the calculation is shown in FIG. 6, like the first embodiment of the invention. The results corresponding to $g_1$ and $g_2$ parenthesized in FIG. 6. FIG. 6 illustrates a relation of the phases $g_1$ and $g_2$ of the first and second light beams of first order diffraction to the amount of shift of the resist. It is seen from the same figure that the larger the amount of shift, the larger the phase $g_1-g_2$ difference. The same calculation has been made also about the relation of the intensities $I_a$ and $I_b$ of the first and second light beams of first order diffraction to the amount of shift, and the results obtained are shown in FIG. 7, like the first embodiment of the invention. The results corresponding to $I_a$ and $I_b$ are parenthesized in FIG. 7. From the same figure it is also seen that the larger the amount of shift, the larger the difference between the intensities $I_a$ and $I_b$ of the first and second light beams of first order diffraction. Thus, there is a correlation between the phase $g_1-g_2$ difference and the difference in intensity of the first and second diffracted light beams of first order diffraction. Therefore, $g(=g_1-g_2)$ can be calculated indirectly by measuring the difference in intensity between the two first order diffracted light beams.

Figure 11:
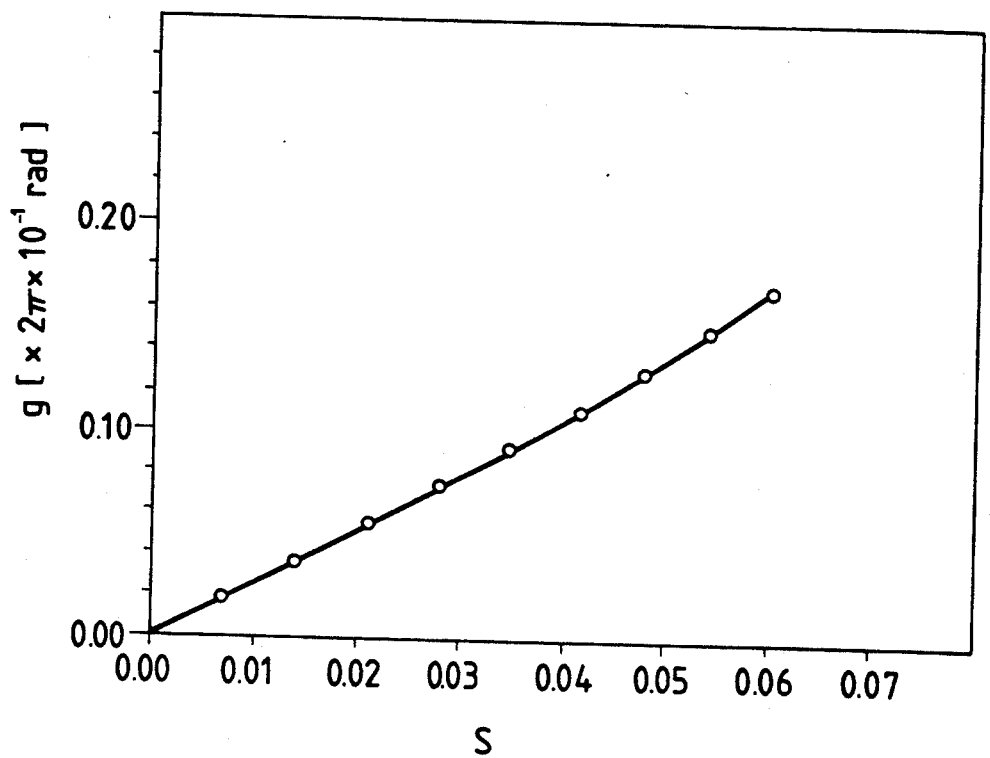
FIG. 11 is a graph showing an intensity difference - phase difference relation between the first- and second-state first order diffracted light beams in FIGS. 6 and 7 in the second embodiment of the present invention.

FIG. 11 shows a relation between the difference in intensity of the two first order diffracted light beams and g. In the same figure, g is plotted along the axis of ordinate, while the difference S in intensity between the two diffracted light beams, which is expressed by the following equation, is plotted along the axis of abscissa:

$$S=(I_1-I_b)/(I_a+I_b) \tag{28}$$

Figure 1:
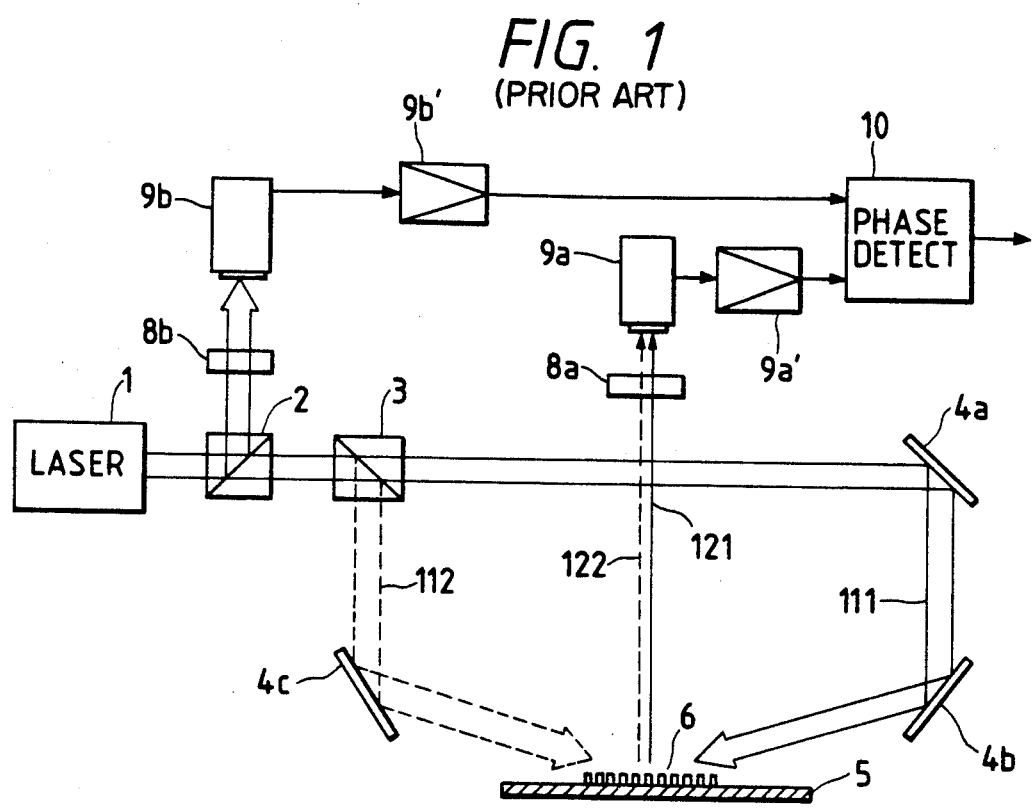
FIG. 1 is a schematic construction diagram showing an example of conventional method and apparatus for measuring a minute displacement.

Into $I_a$ there may be substituted the amplitude of the heterodyne interference signal detected by the photo detector 91 in FIG. 1, while into $I_b$ there may be substituted the amplitude of the heterodyne interference signal detected by the photo detector 92. The control processing circuit 100 calculates S from $I_a$ and $I_b$ in accordance with the equation (28), then calculates g from the predetermined relation of S and g and substitutes the result into the equation (27), whereby a correct value of displacement $\epsilon$ can be calculated.

According to the procedure described above, an accurate displacement measurement can be attained even when the resist distribution is asymmetric with respect to the diffraction grating which is an alignment mark. As to the method of correcting an error based on the asymmetry of resist, reference can be made, for example, to the method described in Japanese Patent Laid-Open No. 242904/89. But according to the present invention, both the detection of a heterodyne interference signal and the detection of a primary diffracted light intensity can be done by a single photo detector, and thus in comparison with the method described in the above publication, the present invention is advantageous in that the signal processing system can be simplified.

The measured displacement $\epsilon$ is converted to an amount of shift of a wafer 73 from the alignment reference position with respect to a reticle 8 by means of the processing/control circuit 100, which circuit controls a drive portion 74 on the basis of the amount of shift to move a stage 75. In this way a circuit pattern on the reticle can be transferred onto the wafer 3 in a desired position.

In FIG. 9, a light beam of wavelength $\lambda_1$ may be applied to the diffraction grating 7 directly from the collimator lens 51 without passing through the reduction lens 6. Thus, the present invention is also applicable to the measurement of a minute displacement in a proximity exposure system or a drawing system using electron beam.

We claim:

1. A method for measuring a minute displacement, comprising the steps of:
   applying a light of a first wavelength at a predetermined angle to a diffraction grating formed on an object whose position is to be detected;
   subjecting each of the resulting diffracted light and regular reflected light to heterodyne interference with a light of a second wavelength different from the first wavelength to generate a measurement signal and a reference signal, respectively; and
   measuring a phase difference between said measurement signal and said reference signal to thereby determine a minute displacement of the object.

2. A method according to claim 1, wherein said predetermined angle is approximately a half of a first order diffraction angle.

3. A method according to claim 1, further comprising the steps of applying the light of the first wavelength to said diffraction grating in a direction opposite to the reflective direction of said regular reflected light; subjecting each of the resulting second diffracted light and second regular reflected light to heterodyne interference with the light of the second wavelength to generate a second measurement signal and a second reference signal, respectively, measuring a second phase difference between the second measurement signal and the second reference signal; and determining a minute displacement of the object from said phase difference and the second phase difference.

4. A method according to claim 3, wherein the measurement of said phase difference and that of said second phase difference are different timewise.

5. A method according to claim 3 or claim 4, wherein the measured minute displacement of the object is corrected on the basis of a difference in amplitude between said measurement signal and said second measurement signal.

6. An apparatus for measuring a minute displacement, including:
   a diffraction grating fixed onto an object;
   a light source for generating a light of a first wavelength and a light of a second wavelength which are slightly different in frequency from each other;
   means for applying the light of the first wavelength to said diffraction grating at a predetermined angle;
   means for subjecting a diffracted light generated from said diffraction grating and the light of the second wavelength to heterodyne interference with each other and generating a measurement signal;
   means for subjecting a regular reflected light generated from said diffraction grating and the light of the second wavelength to heterodyne interference with each other and generating a reference signal;
   a photo detector means for detecting a time variation between said measurement signal and said reference signal; and
   a signal processing circuit for calculating a phase difference between said measurement signal and said reference signal on the basis of said time variation detected by said photo detector means and converting said phase difference into a displacement of said object.

7. An apparatus according to claim 6, further including a light source position change-over means for change-over of the position of a light source which generates the light of the first wavelength.

8. An apparatus according to claim 6 or claim 7, herein said predetermined angle is approximately a half of a primary diffraction angle.

9. A method for measuring a minute displacement, comprising the steps of:
subjecting a light of a first wavelength and a light of a second wavelength, said first and second wavelengths being slightly different from each other, to heterodyne interference with each other to generate a reference signal;
subjecting a diffracted light generated upon incidence of the light of the first wavelength at a predetermined angle on a diffraction grating formed on an object whose position is to be detected, and a second regular reflected light regular reflected light generated upon incidence of the second wavelength light on the diffraction grating in a direction opposite to the reflective direction of a first regular reflected light which is generated upon said incidence of the first wavelength light, to heterodyne interference with each other to generate measurement signal; and
determining a minute displacement of said object on the basis of a phase difference obtained from said reference signal and said measurement signal.

10. A method according to claim 9, wherein said predetermined angle is approximately a half of a primary diffraction angle.

11. A method for measuring a minute displacement, comprising the steps of:
subjecting a diffracted light generated upon incidence of a light of a first wavelength at a predetermined angle on a diffraction grating formed on an object whose position is to be detected, and a second regular reflected light generated upon incidence of a second wavelength slightly different from the first wavelength on the diffraction grating in a direction opposite to the reflective direction of a first regular reflected light which is generated upon said incidence of the first wavelength light, to heterodyne interference with each other to generate a first measurement signal;
subjecting a second diffracted light generated upon said incidence of the second wavelength light and said first regular reflected light to heterodyne interference with each other to generate a second measurement signal; and
determining a minute displacement of said object on the basis of a phase difference obtained from said first and second measurement signals.

12. A method according to claim 11, wherein said predetermined angle is approximately a half of a first order diffraction angle.

13. A method according to claim 11 or claim 12, wherein the measured minute displacement is corrected on the basis of a difference in amplitude between said first and second measurement signals.

14. An apparatus for measuring a minute displacement, including:
a diffraction grating fixed onto an object;
a light source for generating a light of a first wavelength and a light of a second wavelength, said first and second wavelength being slightly different from each other;
means for subjecting said first wavelength light and said second wavelength light to heterodyne interference with each other and generating a reference signal;
means for applying said first wavelength light and said second wavelength light on said diffraction grating each at a predetermined angle;
subjecting a diffracted light of the first wavelength and a regular reflected light of the second wavelength both generated from said diffraction grating to heterodyne interference with each other and generating a measurement signal;
a first photo detector means for detecting a time variation of said reference signal;
a second photo detector means for detecting a time variation of said measurement signal; and
a signal processing circuit for calculating a phase difference between said reference signal and said measurement signal on the basis of the time variations detected by said first and second photo detector means and covering it into a displacement of said object.

15. An apparatus according to claim 14, wherein said predetermined angle is approximately a half of a first order diffraction angle.

16. An apparatus for measuring a minute displacement, including:
a diffraction grating fixed onto an object;
a light source for generating a light of a first wavelength and a light of a second wavelength, said first and second wavelengths being slightly different from each other;
means for applying said first wavelength light and said second wavelength light on said diffraction grating each at a predetermined angle;
means for subjecting a diffracted light of the first wavelength and a regular reflected light of the second wavelength both generated from said diffraction grating to heterodyne interference with each other and generating a first measurement signal;
means for subjecting a diffracted light of the second wavelength and a regular reflected light of the first wavelength both generated from said diffraction grating to heterodyne interference with each other and generating a second measurement signal;
a first photo detector means for detecting a time variation of the first measurement signal;
a second photo detector means for detecting a time variation of the second measurement signal; and
a signal processing circuit for calculating a phase difference between said first and second measurement signals on the basis of the time variations detected by said first and second photo detector means and covering it into displacement of said object.

17. An apparatus according to claim 16, wherein said predetermined angle is approximately a half of a first order diffraction angle.

* * * * *